(12) United States Patent
Lin et al.

(10) Patent No.: US 11,022,548 B2
(45) Date of Patent: Jun. 1, 2021

(54) SAMPLE HOLDER FOR USE IN INFRARED SPECTROSCOPY

(71) Applicant: Ping Lin, Gainesville, FL (US)

(72) Inventors: Ping Lin, Gainesville, FL (US); Xiaojun Liu, Lexington, MA (US)

(*) Notice: Subject to any disclaimer, the term of this patent is extended or adjusted under 35 U.S.C. 154(b) by 0 days.

(21) Appl. No.: 16/607,877

(22) PCT Filed: Apr. 30, 2018

(86) PCT No.: PCT/US2018/030323
§ 371 (c)(1),
(2) Date: Oct. 24, 2019

(87) PCT Pub. No.: WO2018/204290
PCT Pub. Date: Nov. 8, 2018

(65) Prior Publication Data
US 2020/0191711 A1    Jun. 18, 2020

Related U.S. Application Data

(60) Provisional application No. 62/500,139, filed on May 2, 2017.

(51) Int. Cl.
*G01N 21/35* (2014.01)
*G01N 21/3577* (2014.01)
*G01N 21/03* (2006.01)
*G01N 21/3563* (2014.01)

(52) U.S. Cl.
CPC ..... *G01N 21/3577* (2013.01); *G01N 21/0303* (2013.01); *G01N 21/3563* (2013.01); *G01N 2021/0389* (2013.01)

(58) Field of Classification Search
CPC .......... G01N 21/3577; G01N 21/0303; G01N 21/3563; G01N 2021/0389
See application file for complete search history.

(56) References Cited

U.S. PATENT DOCUMENTS

2015/0090880 A1* 4/2015 Andersen .......... G01N 21/3577
                                                     250/339.01
2019/0277756 A1* 9/2019 Foord ................ G01N 21/3577

* cited by examiner

*Primary Examiner* — Hugh Maupin

(57) ABSTRACT

A device for holding samples to be analyzed using the infrared transmission spectroscopy comprised of three or more infrared transparent windows that creates unparalleled gaps while maintaining a consistent path length, which eliminates interference fringes and ensures that quantitative analysis can be achieved. The present invention allows the use of high refractive index material, silicon, as window material. The device using silicon windows can serve both purposes of sample storage and infrared measuring cell. All-purpose disposable sample holders are now possible. In one embodiment, a pre-assembled sample holder is most suitable for loading and analyzing flowable liquid samples. In another embodiment, a sample holder can be easily assembled after high-viscosity fluids and deformable solid samples are loaded. In an alternative embodiment, the device comprised of two or more infrared transparent windows and a reflective mirror can be used for quantitative analysis using transflection infrared spectroscopy.

12 Claims, 11 Drawing Sheets

SAMPLE HOLDER FOR USE IN INFRARED SPECTROSCOPY

BACKGROUND

Infrared (IR) spectrum of a sample is obtained by passing a beam of infrared light through the sample or reflecting a beam of infrared light on the sample surface. The peak corresponding to the frequency of absorption is characteristic of the vibrational frequency of a specific chemical bond or collection of chemical bonds. The frequency and intensity of the absorption holds information of the type and amount of certain components in the sample. Therefore, infrared spectroscopy has been widely employed for qualitative identifications and quantitative measurements. For instance, in clinical analysis, Infrared transmission has been accepted as a powerful technique to analyze body fluids due to its low cost and ability to analyze multiple components simultaneously. (Baker, M. J. et al. 2016. "Fundamental developments in clinical infrared and Raman spectroscopy" Chem. Soc. Rev., 2016, 45, 1792; Shaw, R. A. et al. 2008. "Infrared Spectroscopy of Biological Fluids in Clinical and Diagnostic Analysis. Encyclopedia of Analytical Chemistry", pp. 79-103)

In a standard procedure of IR transmission analysis, a sample is loaded in between the IR transparent windows, the incident beam of infrared light passes the sample and windows, and a transmission infrared spectrum is recorded. It is essential that the material used for the windows of sample holder or cell is highly transmissive in the region of interest. The absorbance is proportional to path length of incident light, and the concentration or the amount of component responsible for the absorption. Therefore, consistent path length is prerequisite for quantitative analysis that the concentration of an analyte can be accurately determined.

The most commonly used window materials currently are made from crystals of inorganic salts that have been precisely machined and polished for maximum optical clarity. Some of these materials are relatively less expensive such as NaCl and KBr. However, due to their water solubility and hygroscopicity, analysis of aqueous samples or water-containing samples is difficult when using these materials as windows. Other materials such as $BaF_2$ and ZnSe are not water soluble, but more expensive. In addition to the problems of cost and sensitivity to moisture, commercially available sample holders have high maintenance requirements. In view of the high costs, disposal of these sample holders is prohibitive. Accordingly, sample holders must be carefully cleaned with solvents after each analysis to prevent contamination from one sample to the next. In some instances, the solvents may present health risks to operators. This also limits their ability to be used in large-scale high-throughput automated analytical testing configurations. In addition, the high cost of sample holders tends to inhibit retention of samples on a long-term basis.

In contrast to the windows materials mentioned above, silicon is transmissive in the standard mid-infrared spectral region and has the advantages of low cost, chemical inertness, mechanical strength, thermal stability and natural abundance. However, the problem of interference fringes becomes prominent due to its relatively high refractive index, making it difficult for quantitative applications.

The interference fringes appear as a sinusoidal pattern seen on the baseline of the spectrum. These fringes are caused by interference between radiation transmitted directly through the cell or sample and the light that has been reflected internally. The higher the difference in refractive index (RI) of the materials at the interface which the reflection occurs, the greater the amplitude of the interference fringes is. (Griffiths P. R. et al 2007 "Fourier Transform Infrared Spectrometry" Second Edition, pp. 253-255)

Interference fringes are common problem for any windows materials. However, the effect is less pronounced for materials with low refractive indexes (RI<2.0) because their refractive indexes are closer to most sample for analysis. But for materials with high refractive indexes, such as silicon (RI≈3.4), the interference fringes often make it difficult for either qualitative or quantitative analysis using IR spectroscopy. One of the approach is to use wedged gap to eliminate fringes. However, creating wedged gap leads to the loss of a consistent path length across the measuring region, therefore no longer suitable for quantitative analysis.

Several types of sample holder have been proposed in prior art to use silicon or other IR materials with high refractive index as window for transmission IR measurement.

U.S. Pat. No. 5,977,545 described a sample carrier using windows made of materials such as silicon, germanium, Zinc Selenide, diamond or plastics, and the thickness of windows is less than one quarter of the shortest wavelength of the measuring wavelength range, usually less than 1000 nm. The thickness of the sample is also preferably less than 1000 nm, or less than one quarter of the shortest wavelength of the measuring wavelength range, for quantitative analysis. However, the difficulty in manufacturing such thin windows and their mechanical weakness makes it impractical for routine applications.

D.E. Pat. No. 10 2007 011 408 A1 proposed the use of silicon as IR windows with a thickness of 400-2000 μm, which also serve as a bottom of a sample cup. This design uses only one window and without a mechanism to accurately fix the path length, therefore can not be used for quantitative analysis.

U.S. Pat. No. 5,463,223 described a disposable all-purpose micro sample holder comprised of a thin rigid plate-shaped frame, substantially opaque to infrared light, including the use of high-refractive-index materials such as silicon, with an optional thin flexible film of 1-2 μm as cover. Such design bears the same issue of inconsistent path length, therefore lacks the capability for quantitative analysis.

U.S. Pat. No. 4,980,551 described a sample holder comprises of two windows of infrared light transmitting material in face-to-face contact, with at least one window having an inner surface portion contoured to form a sample space between the windows shaped to provide adjacent light beam paths which are different in length. Such design makes use of varying path lengths to avoid interference fringes by sacrificing the ability for quantitative measurement. Similarly, U.S. Pat. No. 6,573,988 described a cuvette design using two opposing windows made of a material transparent to the light of the waveband used for the analysis, and by making the window surfaces forming the cuvette cavity non-parallel, the design avoids the interference fringes and enables the use of high-refractive-index materials. However, the design is difficult for routine quantitation analysis because the optical thickness varies across the measuring region.

SUMMARY

The present invention relates a design of devices for holding samples and for quantitative analysis using infrared spectroscopy. The devices can effectively eliminate the interference fringes while maintaining a consistent path length that is critical for quantitative analysis. According to present invention, multiple IR windows are arranged to create multiple cavities for holding sample and the window surfaces forming the cavities are non-parallel. By these means it is ensured that the waves reflected internally in the sample cavity will arrive to the detector in substantially random phases, therefore eliminate the unwanted ripples in the IR absorption spectrum due to interference fringes. The arrangement of IR windows also manages to maintain a consistent path length.

According to various embodiments described herein, a device for analyzing samples using the transmission spectroscopy of infrared radiations is provided. The device includes a pair of optical window parallel to each other, and one or more additional optical windows positioned aslant between said pair of optical windows, wherein a plurality of unparalleled gaps are created between said windows. The device further comprises means for fixing said windows in set positions whereby said windows create consistent path length for infrared radiations of interest. Further, the device comprises means for loading samples into said gaps whereby said gaps are filled with samples for spectroscopic analysis. Furthermore, said windows are transparent to the waveband of interest and each said window has a proper thickness preventing interference fringes results from parallel window surfaces in the waveband of interest. Said unparalleled gaps create proper angles preventing interference fringes results from transmitted and internally reflected infrared radiations in the waveband of interest. Such design allows fringe-free quantitative analysis being achieved using IR transmission spectroscopy.

In an alternative embodiment described herein, a device for analyzing samples using the transflection spectroscopy of infrared radiations is provided. The device includes an optical window and a mirror parallel to said window, and one or more additional optical windows positioned aslant between said optical window and said mirror, wherein a plurality of unparalleled gaps are created between said windows and between windows and mirror. The device further comprises means for fixing said windows and mirror in set positions whereby said windows and mirror create consistent path length for infrared radiations of interest. Further, the device comprises means for loading samples into said gaps whereby said gaps are filled with samples for spectroscopic analysis. Furthermore, said windows are transparent to the waveband of interest and each said window has a proper thickness preventing interference fringes results from parallel window surfaces in the waveband of interest. Said unparalleled gaps create proper angles preventing interference fringes results from directly reflected and internally reflected infrared radiations in the waveband of interest. Such design allows fringe-free quantitative analysis being achieved using IR transflection spectroscopy.

According to present invention, an IR sample holder capable of quantitative analysis can be made with windows of materials such as potassium bromide, sodium chloride, potassium chloride, silver bromide, silver chloride, barium fluoride, calcium fluoride, cesium iodide, cesium bromide, germanium, lithium fluoride, magnesium fluoride, magnesium oxide, thallium bromide-iodide, silicon, doped silicon, silicon dioxide, zinc sulfide, zinc selenide, optical glasses, sapphire, α-quartz, fused quartz, polyethylene, polytetrafluoroethylene or any other infrared transparent materials.

In order to prevent interference fringes resulting from the two surface of a window while maintaining sufficient mechanic strength, the windows have a thickness between 200 microns and 10000 microns. The practical range of the thickness depends on the reflective index of the window materials. The angle of the unparalleled gaps between adjacent windows is between 0 and 15 degrees. The practical setting of the angle depends on the size of the sample holder, thickness of the windows and the path length.

There are extra benefits associated with the using window materials of silicon, doped silicon or surface modified silicon, wherein the surface modification includes polishing, scratching, etching, coating, passivation, oxidation, silanation, or any other physical and chemical modifications. Compared to other commonly used IR window materials, such as KBr, NaCl, $CaF_2$, the silicon as IR windows has the benefits of low cost, chemical inertness, excellent mechanical strength, good thermal stability and easy surface modification. Therefore, many previously-difficult applications become possible. For example, aqueous samples can now be measured easily without the use of those expensive window materials. Quantitative measurement of samples under high temperature and/or high pressure condition can be obtained using sample holders according to present invention. According to one of the embodiments, the sample holder can be pre-assembled and completed sealed after sample loading, therefore hazardous samples can be isolated and readily measured without significant effort in handling of samples. More importantly, due to the low cost of silicon materials, a disposable sample holder for quantitative IR measurement are now possible. An affordable disposable sample holder will save significant time in cleaning and recycling the window materials. Such affordable disposable sample holder provides extra convenience for temporary sample storage. According to one of the embodiments, non-flowable but deformable samples, such as high-viscosity fluids, gels, colloids, small particle solids, can be loaded prior to a quick and convenient assembly of sample cell, saving significant time and efforts in handling these samples compared to current IR measurements. Furthermore, the sample holder can serve as versatile liquid-handling devices in combination of various sample loading mechanism, such as arranging the loading channels at different positions, using more than two loading channels, using extended and flexible tubes for loading samples, or using various liquid-driven mechanisms. For example, the sample holder can serve as a flow-cell by connecting to a flexible tube and using peristaltic pump to generate continuous flow of liquid sample.

In part due to the problems of cost, sensitivity to environment, fragility, and high maintenance requirement, IR spectroscopy has not reached its potential as a routine tool for quantitative analysis. The present invention will help overcome many of these problems, bring convenience to the operation of IR measurements, save significant time and efforts in sample handling and equipment cleaning, and more importantly, enable a much broader application of transmission IR technique.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIG. 1 A pre-assembled sample holder.

FIG. 2 Sample loading and sealing of a pre-assembled sample holder.

FIG. 3 A post-assembled sample holder;

FIG. 4 Examples of post-assembled sample holder with fastening

FIG. 6 Diagram of multiple-window configurations for IR transmission measurements;

DETAILED DESCRIPTION

The present invention provides a device for analyzing samples using a transmission spectroscopy of infrared radiations, comprising: a pair of optical windows parallel to each other; one or more additional optical windows positioned aslant between said pair of optical windows, wherein a plurality of unparalleled gaps are created between said windows; wherein said windows are transparent to a waveband of interest; wherein each said window has a proper thickness preventing interference fringes resulting from parallel window surfaces in the waveband of interest; first means for fixing said windows in set positions whereby said windows create consistent path length for said infrared radiations; wherein said unparalleled gaps create proper angles preventing interference fringes resulting from transmitted and internally reflected infrared radiations in the waveband of interest; and second means for loading samples into said gaps whereby said gaps are filled with samples for spectroscopic analysis.

The present invention further provides a device for analyzing samples using a transflectance spectroscopy of infrared radiations, comprising: an optical window and a mirror parallel to said optical window; one or more additional optical windows positioned aslant between said optical window and said mirror, wherein a plurality of unparalleled gaps are created between said windows and between said windows and said mirror; wherein said windows are transparent to a waveband of interest; wherein said mirror reflects said infrared radiations in the waveband of interest; wherein each said window has a proper thickness preventing interference fringes results from parallel window surfaces in the waveband of interest; wherein said optical mirror surface comprises infrared reflective materials selected from a group consisting of metals, alloys, metallic coating and IR-reflective glass; first means for fixing said windows and said mirror in set positions whereby said windows create consistent path length for said infrared radiations; wherein said unparalleled gaps create proper angles preventing interference fringes resulting from directly reflected and internally reflected infrared radiations in the waveband of interest; and second means for loading samples into said gaps whereby said gaps are filled with samples for spectroscopic analysis.

FIGS. 1A-1D: First Embodiment

Figure 1A:
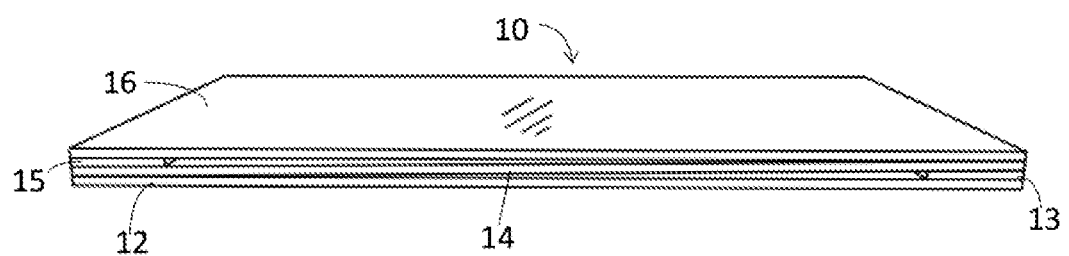
FIG. 1A View of the main body.
Figure 1B:
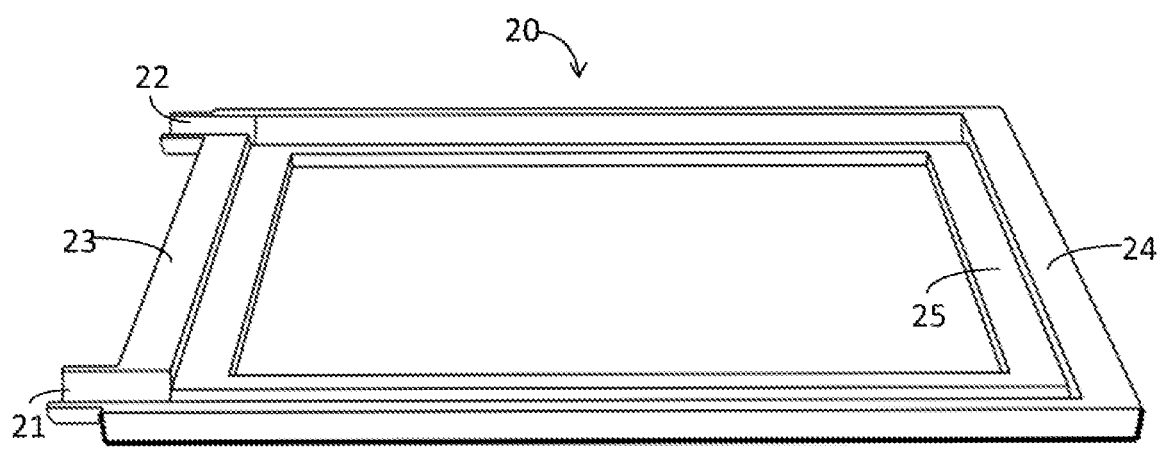
FIG. 1B View of a half-enclosure.
Figure 1C:
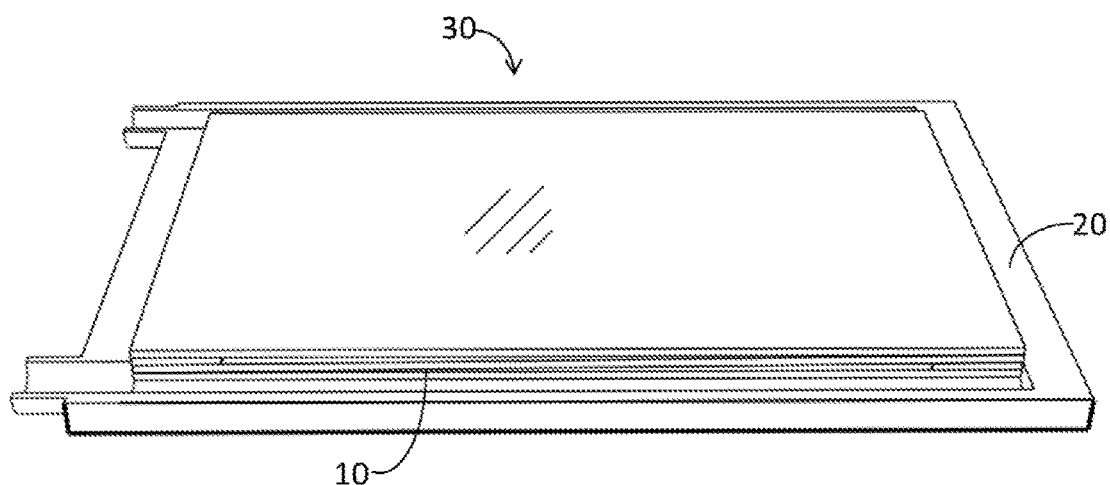
FIG. 1C View of a half-enclosure with main body.
Figure 1D:
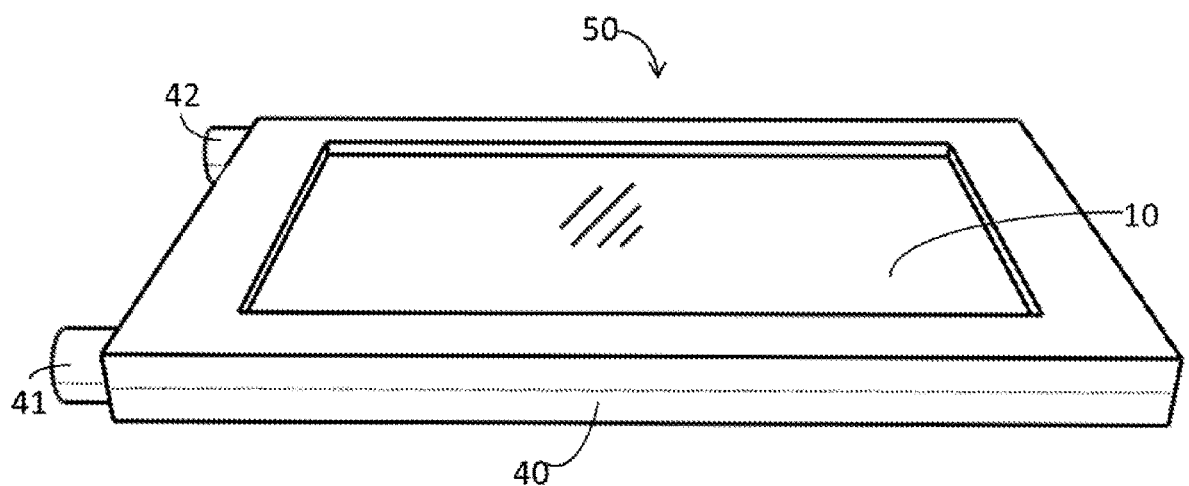
FIG. 1D View of a fully-assembled sample holder.

One embodiment of the present invention is illustrated in FIGS. 1A-1D. The device is most suitable for holding flowable liquid samples. The illustrations are not in real scale, the spacers and gaps are exaggerated for clarity. FIG. 1A shows the main body 10 of the sample holder, which includes three flat windows 12, 14 and 16. The windows are made of IR transparent materials, such as silicon. The windows have a thickness of 775 µm. At such thickness, interference fringes caused by two surfaces of each window are negligible. Windows with thickness greater than 500 µm are found to be sufficient to eliminate such interference fringes, therefore also suitable for IR windows. However, we do observe unwanted ripples in IR absorption spectra using silicon windows with thickness of 300 µm. 12 and 16 are the exterior window and 14 is the interior window. In this embodiment, spacers are used to ensure consistent path length. Spacers may be made of a variety of materials, such as metal or plastic, depending on the conditions to which it will be subjected or exposed. Spacers 13 and 15 are of same thickness, usually in the range of 10 to 1000 µm. In other embodiments, spacers of other thickness and more than two spacers may be used on each end of the middle window. In other embodiments, wedged spacers may be used alone the side of the windows. Spacer 13 is placed at one end between windows 12 and 14. Spacer 15 is placed at the opposite end between windows 14 and 16. The two spacers are used to slant window 14 to form two unparalleled gaps between windows 12 and 14, and between windows 14 and 16. FIG. 1B shows the half-enclosure 20 of sample holder, which is a rigid frame made of polycarbonate. The rigid frame can be made of any materials with sufficient mechanical strength and chemical resistance to samples to be analyzed. The frame can be manufactured through machining, molding or other manufacturing processes. A complete enclosure is formed by bonding two half-enclosures 20 together to hold the main body 10 inside. The complete sample holder serve both purposes of sample storage and cell for transmission measurements. In the half-enclosure 20, there are two half-ducts 21 and 22 that when combined with their counterparts from another half-enclosure, forms the channels for loading liquid sample. Contact surfaces 23 and 24 will be fused with their counterparts from another half-enclosure. Surface 25 will be bonded to main body 10 using adhesive, sealants, thermo-compression bonding, ultrasonic bonding or any appropriate approaches. When necessary, means can be taken to prevent any leakage between surface 25 and main body 10, such as adhesive and gaskets. FIG. 1C shows the view of assembly 30 after putting together the main body 10 and a half-enclosure 20. FIG. 1D shows the view of a fully-assembled sample holder 50, which includes main body 10 and a completed enclosure 40. Enclosure 40 is formed by two half-enclosure 20s which are mirror-symmetric to each other. The completed sample loading channels 41 and 42 are formed by two half-duct 21s and 22s. In other embodiments, the enclosure may be made of two parts that are not symmetric, and have more than two sample loading channels.

Figure 2A:
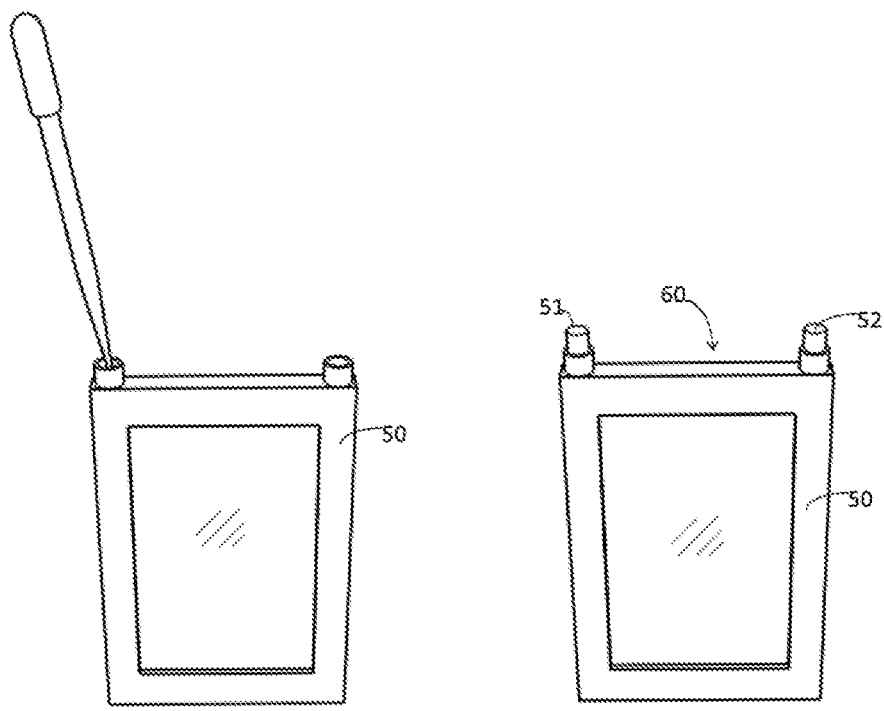
FIG. 2A Sampling loading using single channel.
Figure 2B:
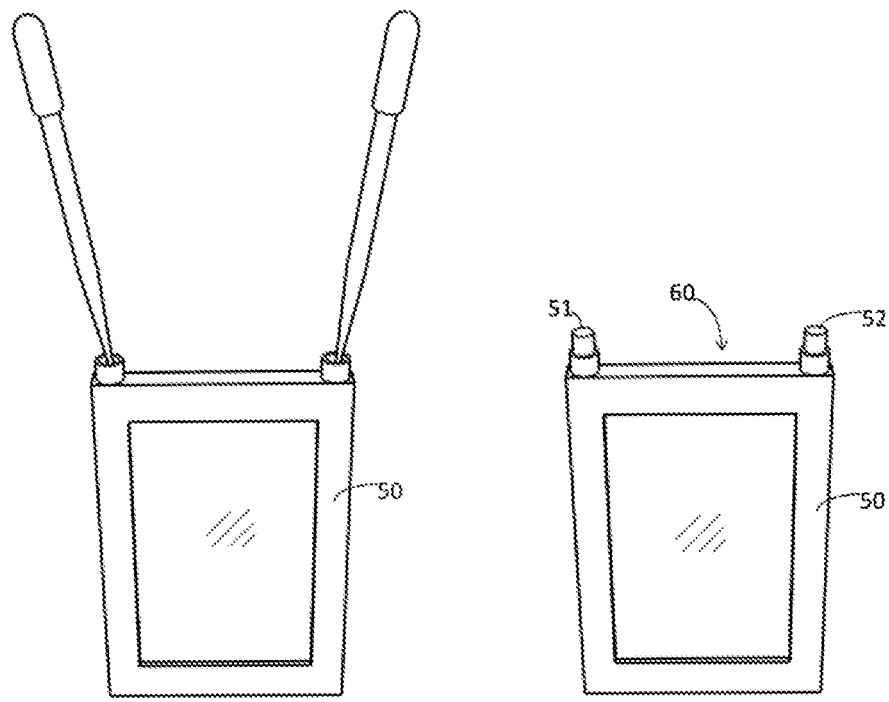
FIG. 2B Sampling loading using two channels.

FIGS. 2A-2B: Operation of First Embodiment

As demonstrated in FIG. 2A, A liquid sample can be loaded into a fully-assembled sample holder 50 through one of the loading channels 41 or 42 using pipettes, droppers, syringes, needles and apparatus alike. The sample holder can be completed sealed by putting stoppers 51 and 52 (or caps) on the loading channels 41 and 42. A piston can be used to drive the sample into the gap while also serving as a stopper. The sample-loaded and sealed sample holder 60 is ready for IR transmission measurements, or saved for future IR transmission measurements. In FIG. 2B, more than one liquid samples can be loaded simultaneously into the fully-assembled sample holder 50 through channels 41 and 42 separately using pipettes, droppers, syringes, needles and apparatus alike. The loaded liquid samples can mix and/or react in the sample holder 50. The IR transmission measurements can be used to record the time-dependent kinetic process when appropriate. Other than conventional IR measurement, the sample-loaded and sealed sample holder can make it a lot easier for automated IR transmission measurements.

Infrared spectrometers for performing IR transmission measurements are sufficiently known in the prior art. Almost any current commercially available IR transmission spectrometers, such as Thermo Fisher Scientific's Nicolet® FTIR Spectrometer, are suitable for performing measurements with sample holders according to the present invention. To do so, the sample-loaded and sealed sample holders are placed on the infrared spectrometer and exposed to infrared radiation.

Figure 7:
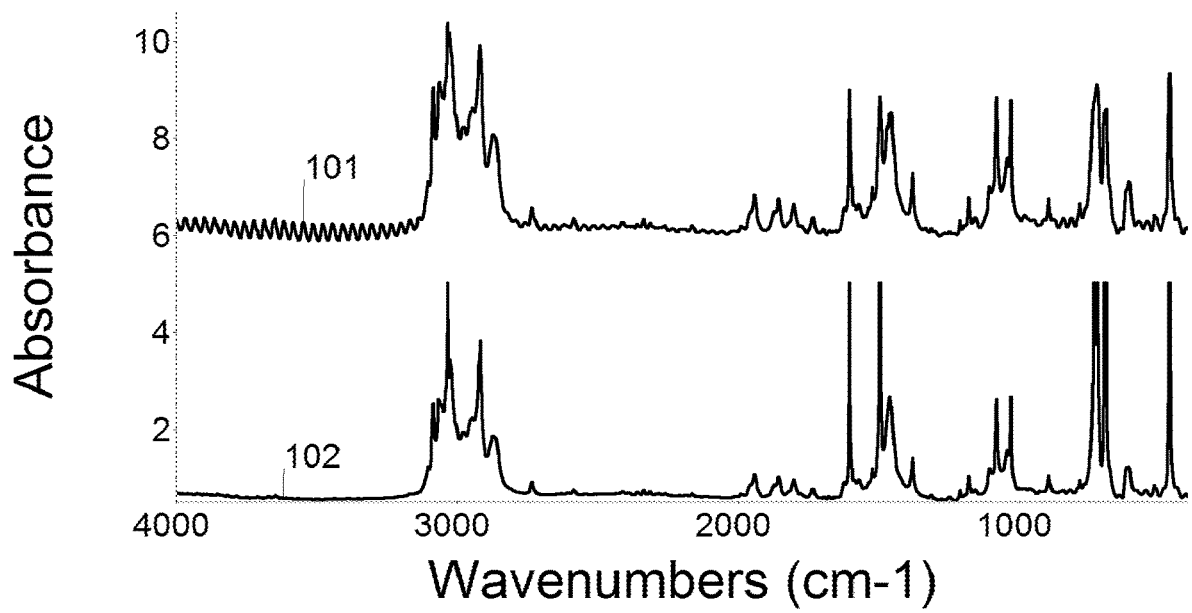
FIG. 7 IR spectra of toluene collected in a regular two-window cell and present three-window cell using silicon windows.

To demonstrate the ability of eliminating interference fringes according to present invention, FIG. 7 shows a first spectrum 101 recorded for toluene filled sample holder comprise of two parallel silicon windows and a second spectrum 102 recorded for a toluene filled sample holder comprise of three silicon windows in which two of the windows are parallel to each other and the third window is positioned aslant between the two windows. It is clear that a number of ripples are observed in spectrum 101. Such ripples are highly undesirable, especially for standardization of the apparatus, or calibration, or quantitative analysis. In the spectrum 102, recorded using a fully-assembly sample holder according to present invention, there is no observable ripples due to interference fringes.

Figure 10:
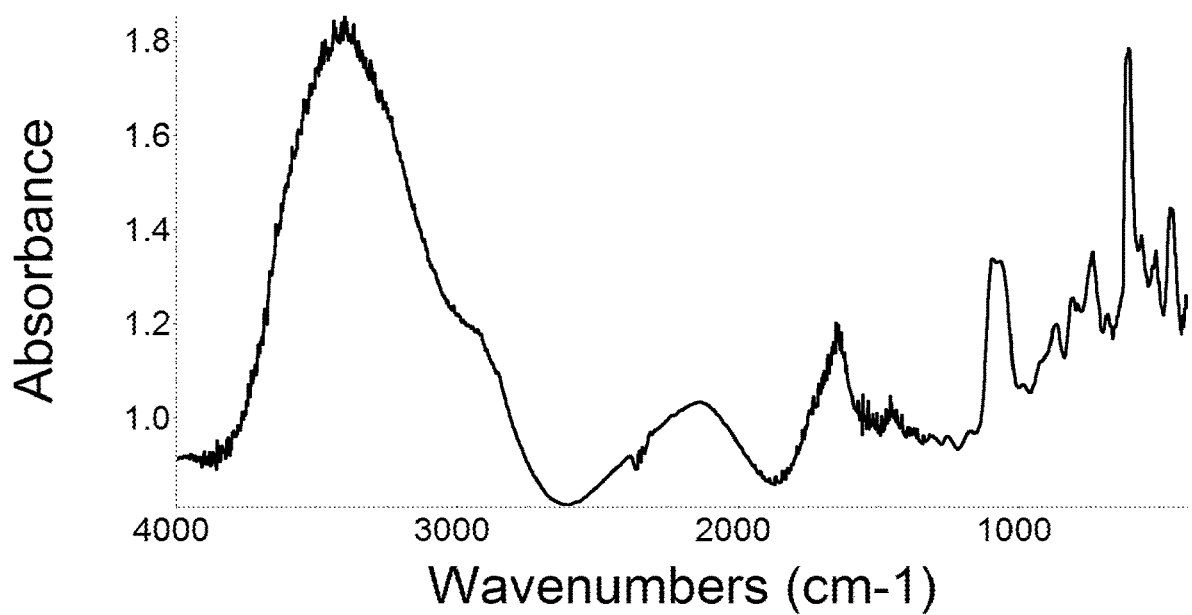
FIG. 10 IR spectrum of a saliva sample with present three-window cell using silicon windows.

To demonstrate the ability of handling aqueous biological sample according to present invention, FIG. 10 shows an infrared spectrum of a Saliva sample recorded using a fully-assembly sample holder according to present invention. The spectrum shows characteristic features of Saliva, free of interference fringes. Saliva represents biological samples which post great challenges for current IR measurement as its water content prevents the use of salt-based sample cells, and reusing of sample cells carries the risk of sample contamination, and the sample handling posts potential biohazards for IR operators. A disposable fully-assembled sample holder according to present invention make it simple and convenient to make the IR measurement without posting any threat to the health of the IR operators.

Figure 11:
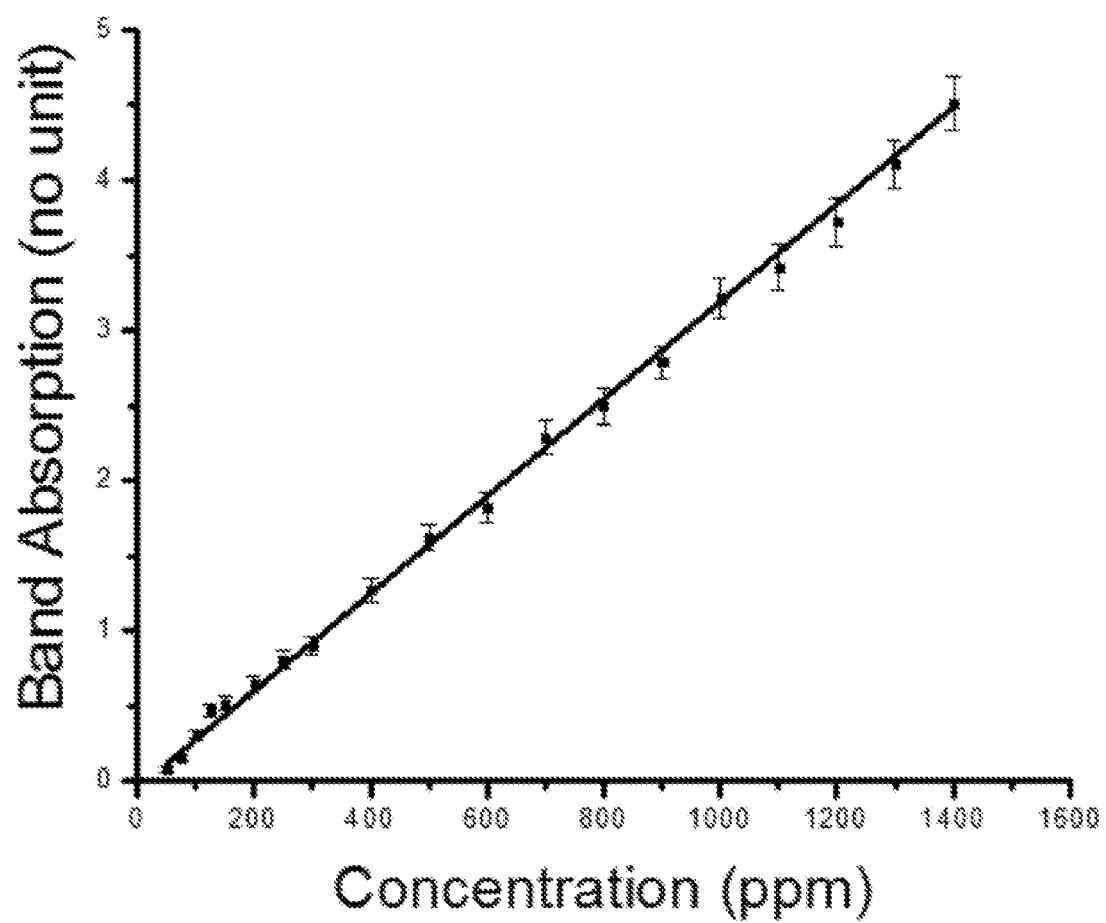
FIG. 11 Quantitative analysis of grease in cyclohexane with present three-window cell using silicon windows.

To demonstrate the ability of quantitative analysis according to present invention, FIG. 11 shows the plot of IR intensities as a function of concentrations of an oil & grease sample. A series of cyclohexane solutions with controlled oil & grease concentrations were prepared and loaded into fully-assembled sample holders according to present invention. A quality control standard, Oil & Grease Snip and Pour Standards from Horizon Technology Inc. (a tube contains exactly 10 ml of 20 mg n-Hexadecane and 20 mg Stearic Acid dissolved in 99.5% acetone) was used to prepare cyclohexane solutions with concentrations in the range of 50 to 1400 ppm. The path length was set at 100 μm using spacers. At each concentration, duplicated measurements were performed and the average band intensities with error bar were plotted. The excellent linear correlation between the concentrations of oil & grease and the IR band intensities demonstrates the ability of using sample holders according to present invention for quantitative analysis.

FIGS. 3A-3B, 4A-4C: Second Embodiment

Figure 3A:
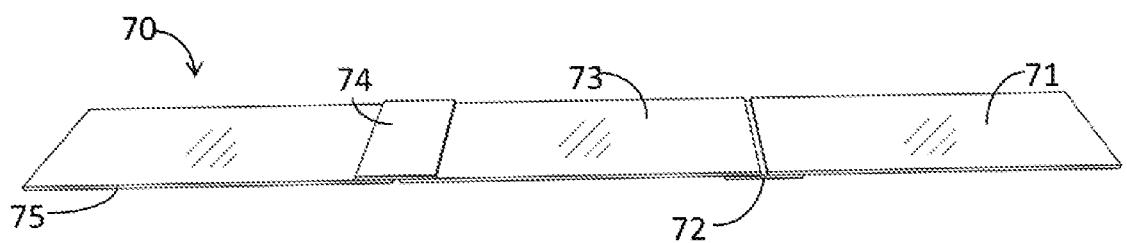
FIG. 3A View of an unfolded main body.
Figure 3B:
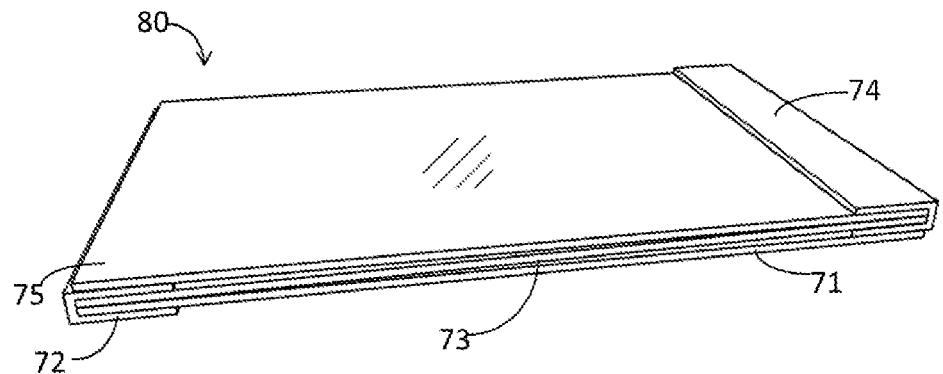
FIG. 3B View of a folded main body
Figure 4A:
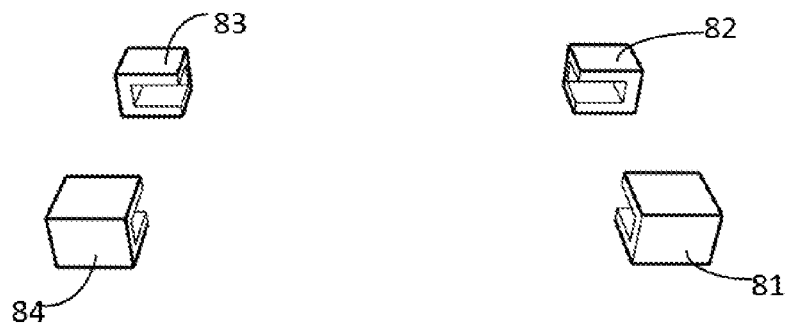
FIG. 4A View of a folded sample holder fastened by four corner clamps.
Figure 4A:
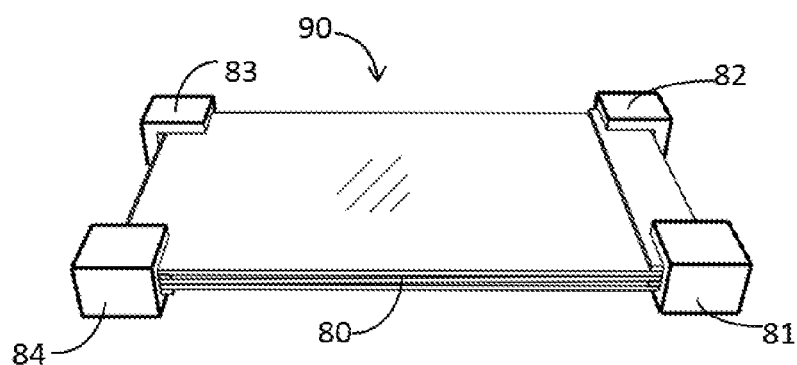
Figure 4B:
FIG. 4B View of a folded sample holder fastened by two edge clamps.
Figure 4B:
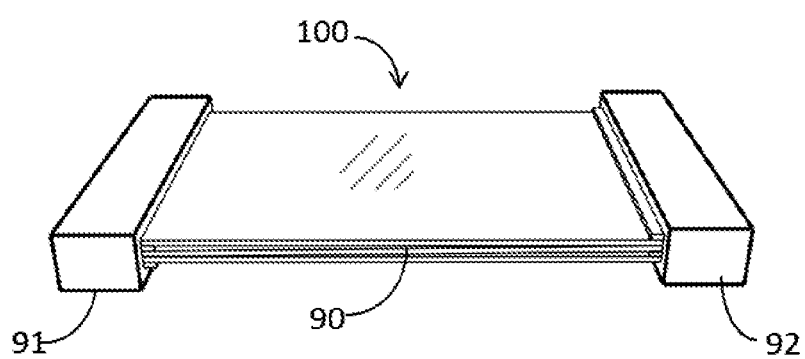
Figure 4C:
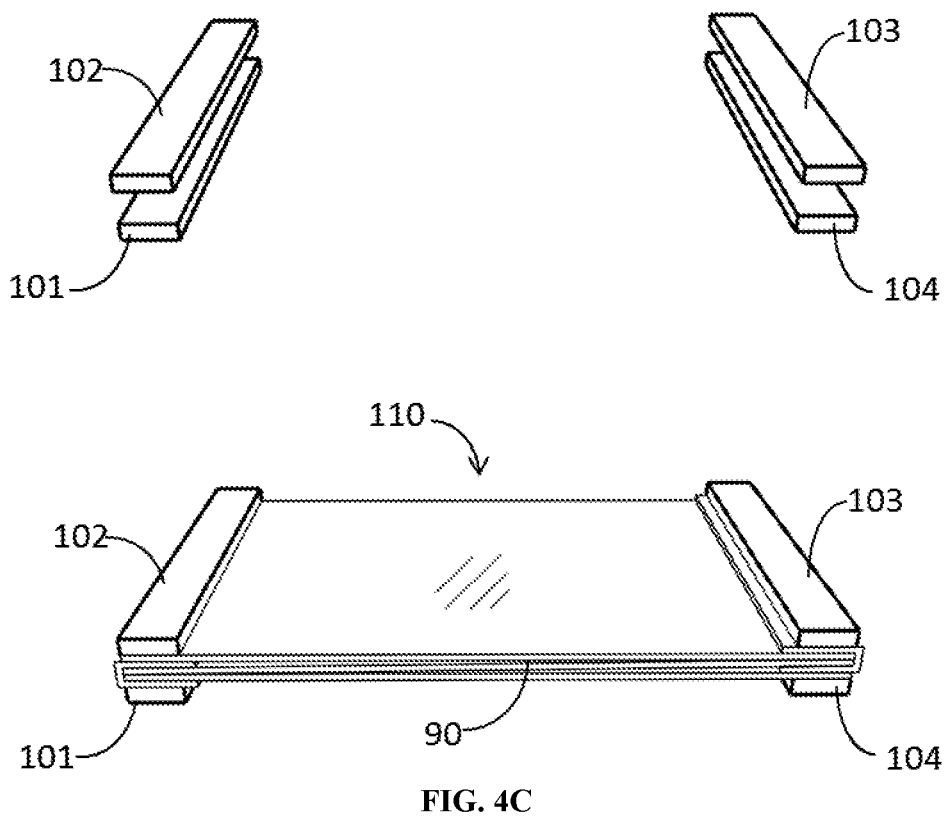
FIG. 4C View of a folded sample holder fastened by four magnet bars.

Another embodiment of the present invention is illustrated in FIGS. 3A-3B and 4A-4C. The device is suitable for non-flowable but deformable samples. The device is designed to facilitate the easy assembly of sample holder after loading deformable samples. FIG. 3A shows the view of the open form of the main body 70 of sample holder. The main body 70 includes three flat silicon windows 71, 73 and 75, and spacers 72 and 74. Windows 71 and 75 are exterior windows that have only one surface forming the sample holding cavities. Window 73 is inside window that both the surfaces are used in forming the sample holding cavities. The silicon windows have a thickness of 775 μm. In this embodiment, spacers also serve as hinges to connect the windows and provide the flexibility during assembly of sample holder. Windows 71 and 73 are connected by spacer 72 on one side. Windows 73 and 75 are connected by spacer 74 on the opposite side. The spacers 72 and 74 are of same thickness and ensure a consistent path length for IR measurement. Spacers 72 and 74 are bonded to the windows by adhesives and other mechanisms alike. The non-flowable but deformable samples will be loaded twice to the cavities created by the windows. According to this embodiment, sample loading can be performed in the following steps. First, a sample will be loaded to the inner surface of exterior windows 71. Inside window 73 will be folded around the spacer hinge 72 against the sample, and pressure can be applied to smear the sample to ensure the regions in cavities for IR measurement will be filled with sample. Next, the sample is loaded to the open surface of inside window 73. The exterior window 75 will be folded around the spacer hinge 74, and pressure can be applied to smear sample to ensure the regions in cavities for IR measurement is filled with sample. The twice sample-loadings and gap-fillings are needed to ensure a constant path length essential for quantitative analysis. For qualitative analysis, a wedged sample holder using two windows and one spacer is sufficient. It may be necessary to apply sufficient pressure to make sure the windows and spacers are in close contact and a consistent path length is achieved. FIG. 3B shows the view of the assembled main body 80 of sample holder after sample is loaded following the procedure described above. The assembly main body 80 does not required a sealable enclosure for IR measurement, but still needed to be fastened for easy handling. FIGS. 4A-4C shows some examples of fastening mechanisms. FIG. 4A shows the view of a clamp-fastened sample holder 90, in which the assembled main body 80 after sample loading is fastened by four corner clamps 81, 82, 83 and 84. FIG. 4B shows the view of another clamp-fastened sample holder 100, in which the assembled main body 80 after sample loading is fastened by two edge clamps 91 and 92. FIG. 4C shows the view of a magnet-fastened sample holder 110, in which the assembled main body 80 after sample loading is fastened by four magnet bars 101, 102, 103 and 104. The completed sample holders 90, 100 and 110 with samples loaded are ready for IR transmission measurements. All these fastening mechanisms are easy to make with low cost, and the clamps and magnet bars are reusable. In other embodiments, fastening mechanisms such as using plates and fastening bolts can be used.

Figure 8:
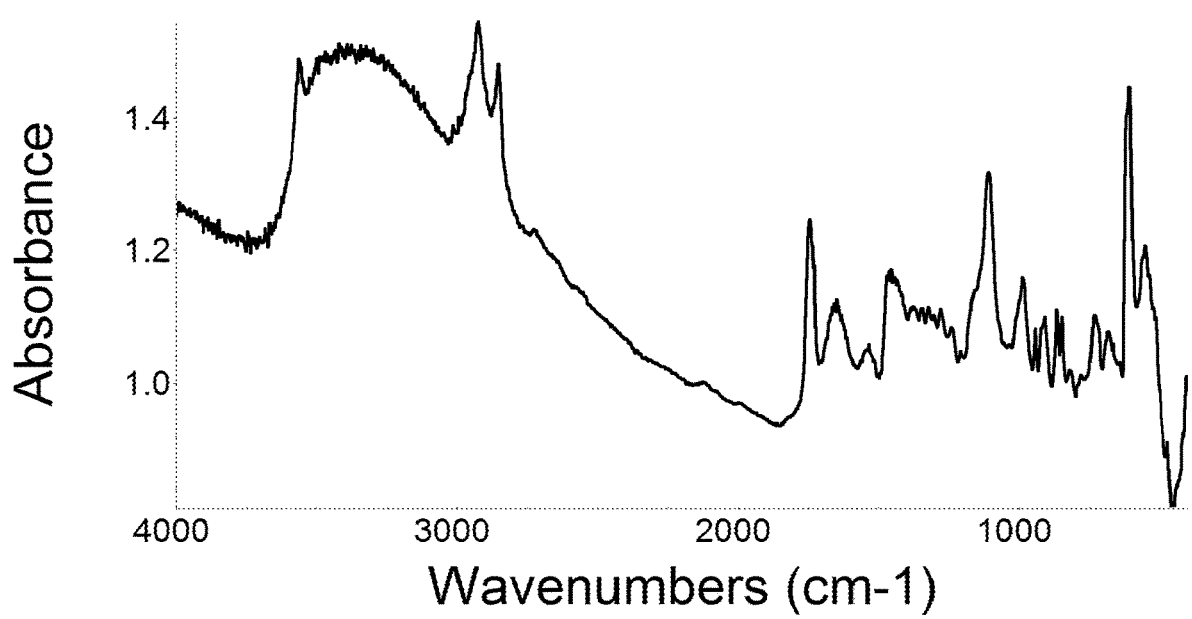
FIG. 8 IR spectrum of a melted chocolate sample with present three-window cell using silicon windows.

To demonstrate the ability of handling hard-to-clean samples according to present invention, FIG. 8 shows the infrared spectrum of a chocolate sample using a post-assembled sample holder illustrated in FIGS. 3 and 4. The sample holder makes use of silicon windows with thickness of 775 μm, and metal spacers with thickness of 13 μm. The recorded spectrum is free of interference fringes. The sample was prepared by pressing soft solid chocolate to smear it between the silicon windows before the IR spectrum was recorded. Due to the low cost of windows, the main body of the sample holder can be disposed without taking a lot of effort to clean and recycle the windows.

Figure 9:
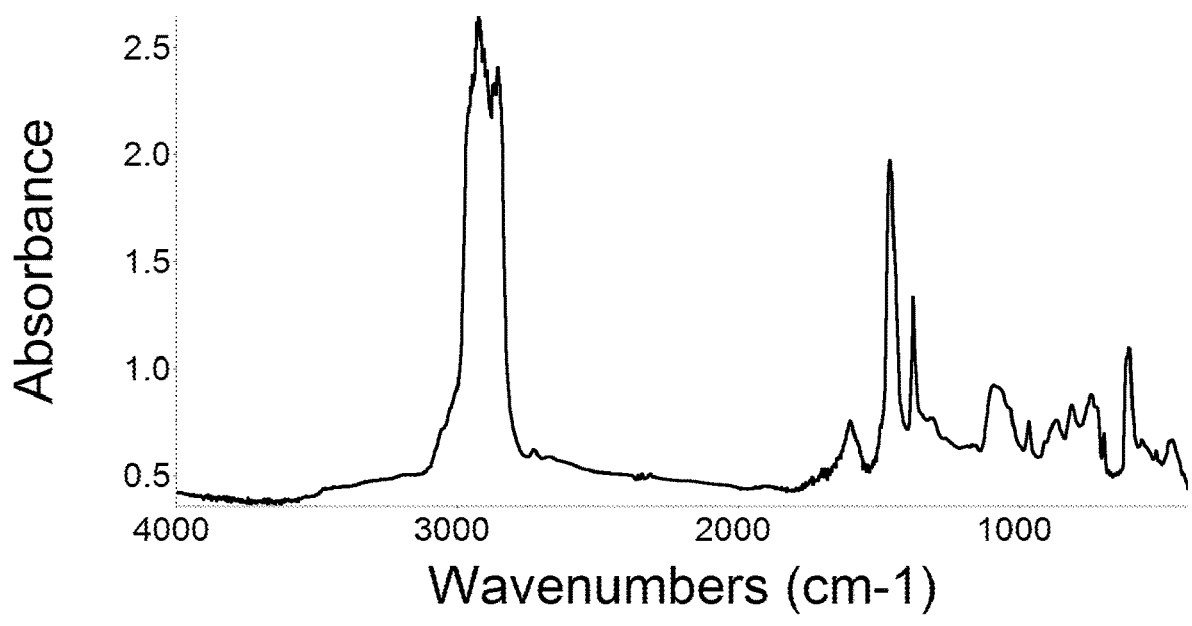
FIG. 9 IR spectrum of a melted asphalt sample with present three-window cell using silicon windows.

To demonstrate the ability of handling another difficult samples at high temperature according to present invention, FIG. 9 shows the infrared spectrum of a melted asphalt sample using a post-assembled sample holder illustrated in FIGS. 3 and 4. The sample holder makes use of silicon windows with thickness of 775 μm, and metal spacers with thickness of 13 μm. The recorded spectrum is free of interference fringes. The sample was prepared by heating and hard pressing the asphalt to smear it between the silicon windows. The excellent mechanical and thermal properties of silicon make it possible to prepare such sample cells for IR analysis. The low-cost silicon as window materials makes disposable sample holder a viable solution for such samples. These samples are known to be extremely difficult in cell preparation and cleaning using conventional transmission cells.

FIGS. 6A-6D: Additional Embodiments

Figure 6A:
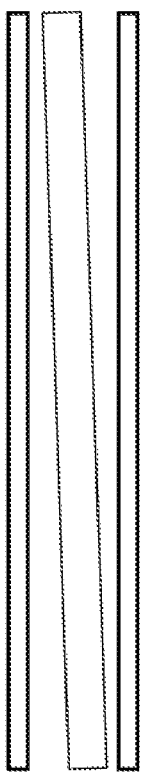
FIG. 6A An example of open-gap three-window transmission configuration.
Figure 6B:
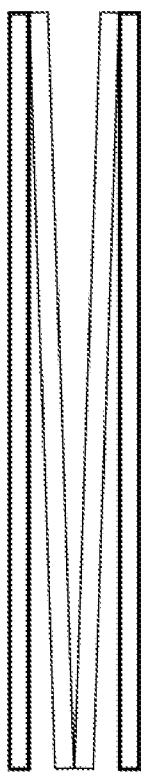
FIG. 6B An example of four-window transmission configuration.
Figure 6C:
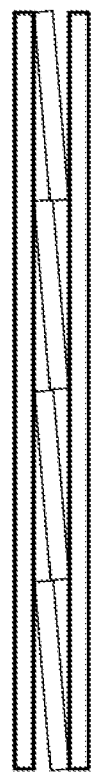
FIG. 6C An example of multiple comb-like middle window transmission configuration.
Figure 6D:
FIG. 6D An example of multiple zigzag-like middle window transmission configuration.

Other embodiments of the present invention are possible. FIGS. 6A-6D illustrates a few examples of the main body of a sample holder by diagrams according to present invention. One principle is to use a pair of optical window parallel to each other, with one or more additional optical windows positioned aslant between said pair of optical windows, wherein a plurality of unparalleled gaps are created between said windows. The unparalleled gaps can effectively eliminate the interference fringes while the arrangements of windows maintain a consistent path length needed for quantitative analysis. FIG. 6A demonstrates a three-window configuration without having the middle window in contact with any of the exterior windows, which can be achieved by using two sets of spacers of different sizes at both ends or fixing windows to an enclosure frame at specific position. FIG. 6B demonstrates an example of four-window configuration using two slanting middle windows to form three unparalleled gaps. FIG. 6C demonstrates an example of a multiple-window configuration using a series of small slanting middle windows. FIG. 6D demonstrates another example of multiple-window configuration using a series of small slanting middle windows. FIG. 6A also demonstrate that the exterior or middle windows can be of different thickness.

Figure 5:
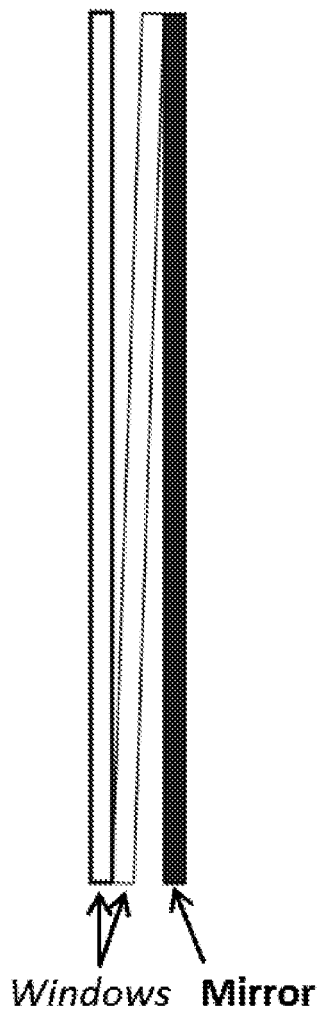
FIG. 5 Diagram illustrating two-window one-mirror configuration for transflection IR measurements.

FIG. 5: Alternative Embodiment

One embodiment of the present invention is most suitable for transflection IR measurements. In a transflection IR measurement, instead detecting IR radiations passing through all the windows and sample, the IR radiation is reflected by a mirror and detected on the same side of the light source. FIG. 5 illustrates an example of the main body of a sample holder by diagram according to present invention. In this diagram, mirrors are shown in black. This embodiment uses an optical window and a mirror parallel to said optical window, with one or more additional optical windows positioned aslant between said optical window and said mirror, wherein a plurality of unparalleled gaps are created between said windows and between said windows and said mirror. The mirror is made of IR-reflective materials such as metals. The unparalleled gaps can effectively eliminate the interference fringes while the arrangements of windows and mirror maintain a consistent path length needed for quantitative analysis. Pre-assembled sample holder demonstrated in FIG. 1 and post-assembled sample holder demonstrated in FIGS. 3 and 4 are also applicable to this embodiment. Other embodiments of the middle-window configurations demonstrated in FIG. 6 are also applicable to this embodiment.

From the description above, a number of advantages of some embodiments of present invention become evident:

IR sample holders using material such as silicon as windows allows IR spectroscopy becoming a routine tool for analysis of various samples, e.g. aqueous sample transmission becomes practical due to silicon's inertness to water and moisture. A sample holder according to present invention is also capable for IR measurement under high temperature and/or high pressure. A sample holder according to present invention can be used to perform IR analysis of a static or dynamics system. Due to the low cost of silicon materials, disposable sample holder can be made affordable. Disposable sample holder capable of quantitative analysis can bring great convenience in sample preparation and eliminate the need for IR cell maintenance. A sealable disposable sample holder is ideal for hazardous, or bio-hazardous samples. A sealable disposable sample holder can also provide extra convenience for temporary sample storage. A sealable disposable sample holder is also ideal for large-scale high-throughput automated analytical testing.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What the claim is:

1. A device for analyzing a sample using a transmission spectroscopy of infrared radiations, comprising:
   a pair of optical windows parallel to each other;
   one or more additional optical windows positioned aslant between said pair of optical windows, wherein a plurality of unparalleled gaps are created between said parallel windows and additional windows;

wherein both said parallel windows and additional windows are transparent to a waveband of interest;

wherein each of said parallel windows and additional windows has a proper thickness whereby no interference fringes result from parallel window surfaces in the waveband of interest;

wherein said parallel windows and additional windows are fixed in set positions whereby said parallel windows and additional windows create consistent path length for said infrared radiations; and wherein said unparalleled gaps create proper angles whereby no interference fringes result from transmitted and internally reflected infrared radiations in the waveband of interest.

2. The device according to claim 1, wherein said parallel windows and additional windows comprise infrared transparent materials of potassium bromide, sodium chloride, potassium chloride, silver bromide, silver chloride, barium fluoride, calcium fluoride, cesium iodide, cesium bromide, germanium, lithium fluoride, magnesium fluoride, magnesium oxide, thallium bromide-iodide, silicon, doped silicon, silicon dioxide, zinc sulfide, zinc selenide, optical glasses, sapphire, α-quartz, fused quartz, polyethylene, or polytetrafluoroethylene.

3. The device according to claim 1, wherein said parallel windows and additional windows comprise infrared transparent materials of silicon, doped silicon or surface modified silicon, wherein said surface modification is selected from polishing, scratching, etching, coating, passivation, oxidation, silanation and chemical modification.

4. The device according to claim 1, wherein said parallel windows and additional windows have a thickness between 200 microns and 10000 microns.

5. The device according to claim 1, wherein said unparalleled gaps between said parallel windows and additional windows have an angle between 0 degree and 15 degrees.

6. The device according to claim 1, wherein said parallel windows and additional windows are fixed by placing spacers between said parallel windows and additional windows, or by adhesives and frame to hold said parallel windows and additional windows in set positions.

7. The device according to claim 1, further comprising one or a plurality of openings that enables the loading of the sample into pre-assembled enclosure holding said parallel windows and additional windows in set positions.

8. The device according to claim 7, wherein said openings are sealed by means of stoppers, plugs, caps, sealants, clamps and combination thereof.

9. The device according to claim 7, wherein said pre-assembled enclosure includes full-body frame with one or a plurality of openings, and means for preventing any leakage between frame and said parallel windows and additional windows.

10. The device according to claim 7, wherein said sample is a flowing sample of fluid that enters and exits the device so as to repeatedly replace the sample contained therein.

11. The device according to claim 1, further comprising spacers placed between said parallel windows and additional windows, and fastening means for holding post-assembled device in place after loading deformable samples onto the inner surface of said parallel windows and additional windows.

12. A device for analyzing samples using a transflectance spectroscopy of infrared radiations, comprising:

an optical window and a mirror parallel to said optical window;

one or more additional optical windows positioned aslant between said optical window and said mirror, wherein a plurality of unparalleled gaps are created between said optical window and said additional windows and between said additional windows and said mirror;

wherein said optical window and additional windows are transparent to a waveband of interest;

wherein said mirror reflects said infrared radiations in the waveband of interest;

wherein each of said optical window and additional windows has a proper thickness whereby no interference fringes result from parallel window surfaces in the waveband of interest;

wherein said optical mirror surface comprises infrared reflective materials selected from a group consisting of metals, alloys, metallic coating and IR-reflective glass;

wherein said optical window and additional windows and said mirror are fixed in set positions whereby said optical window and additional windows and said mirror create consistent path length for said infrared radiations; and wherein said unparalleled gaps create proper angles whereby no interference fringes result from directly reflected and internally reflected infrared radiations in the waveband of interest.

* * * * *